(12) United States Patent
Hirata et al.

(10) Patent No.: US 7,233,437 B2
(45) Date of Patent: Jun. 19, 2007

(54) LASER-SCANNING MICROSCOPE

(75) Inventors: Tadashi Hirata, Hachioji (JP); Hiroya Fukuyama, Machida (JP)

(73) Assignee: Olympus Corporation (JP)

( * ) Notice: Subject to any disclaimer, the term of this patent is extended or adjusted under 35 U.S.C. 154(b) by 117 days.

(21) Appl. No.: 11/085,503

(22) Filed: Mar. 22, 2005

(65) Prior Publication Data

US 2005/0270641 A1    Dec. 8, 2005

(30) Foreign Application Priority Data

Mar. 25, 2004    (JP)    ............................. 2004-089195

(51) Int. Cl.
*G02B 21/06*    (2006.01)

(52) U.S. Cl. ................................... 359/385

(58) Field of Classification Search ................ 359/385
See application file for complete search history.

(56) References Cited

U.S. PATENT DOCUMENTS

| 4,806,004 | A  | * | 2/1989  | Wayland ..................... 359/389 |
| 6,181,474 | B1 | * | 1/2001  | Ouderkirk et al. .......... 359/629 |
| 6,563,632 | B1 | * | 5/2003  | Schoeppe et al. ........... 359/368 |
| 6,963,398 | B2 | * | 11/2005 | Sasaki et al. ................ 356/318 |
| 2002/0097487 | A1 | * | 7/2002 | Arai ........................... 359/385 |
| 2004/0032650 | A1 | * | 2/2004 | Lauer ......................... 359/385 |
| 2005/0073675 | A1 | * | 4/2005 | Lo ........................... 356/237.2 |

FOREIGN PATENT DOCUMENTS

| JP | 03-087804 | 4/1991 |
| JP | 05-072481 | 3/1993 |
| WO | WO 90/00754 | 1/1990 |

\* cited by examiner

*Primary Examiner*—Drew A. Dunn
*Assistant Examiner*—Joshua L. Pritchett
(74) *Attorney, Agent, or Firm*—Kenyon & Kenyon LLP

(57) ABSTRACT

A compact laser-scanning microscope that allows in-vivo observation, particularly of cells, with wavelengths ranging from the visible to the infra-red, can be provided. The laser-scanning microscope includes a laser light source unit, an optical fiber, a collimator optical system, an optical scanning unit, a pupil projection optical system, an objective optical system, and a detection optical system that detects fluorescence or reflected light from the specimen, via the objective optical system, the pupil projection optical system, the optical scanning unit, the collimator optical system and the optical fiber. The objective optical system can be attached to and detached from the pupil projection optical system near the intermediate image position.

10 Claims, 12 Drawing Sheets

LASER-SCANNING MICROSCOPE

BACKGROUND OF THE INVENTION

1. Field of the Invention

The present invention relates to a laser-scanning microscope used in fluorescence examination or confocal fluorescence examination in applications such as imaging and the study of cellular function.

2. Description of Related Art

In the related art, a laser-scanning microscope is a known apparatus for examining cellular function and so on. Such an apparatus functions by irradiating a specimen, such as a living organism, with excitation light from the surface thereof and selectively detecting fluorescence emitted from a position at a predetermined depth in the specimen. (See, for example, Japanese Unexamined Patent Application Publication No. HEI-3-87804 (page 2, etc.) and Japanese Unexamined Patent Application Publication No. HEI-5-72481 (FIG. 1, etc.).)

In addition to standard microscope examination, this laser-scanning microscope can obtain images by scanning laser light converged onto a minute spot on the specimen with a scanning unit such as galvano mirrors or the like and detecting the fluorescence emitted by the specimen.

This laser-scanning microscope affords an advantage in that, since the minute spot allows excellent resolving power and light outside the minute spot can be eliminated, it is possible to obtain sharp observation images with a high signal-to-noise ratio.

However, the known laser-scanning microscope suffers from the drawback that the size of the apparatus is large because, in addition to optical systems for standard fluorescence observation, such as an objective lens and an imaging lens, it is also necessary to include optical systems such as a pupil projection lens and a scanning mechanism.

In general, therefore, the optical system of the laser-scanning microscope has an objective lens focal length of approximately 180 mm. As a result, the overall length from the specimen to the scanning mechanism located close to the conjugate position of the pupil of the objective lens is 400 to 500 mm, which makes the overall size of the apparatus relatively large.

Accordingly, to allow confocal fluorescence examination or fluorescence examination, the specimen must be positioned on a stage of the microscope. In practice, therefore, when carrying out in-vivo fluorescence examination of cells or small animals such as rats under incubation conditions, there is a restriction in that a suitable examination environment must be created on the stage.

Furthermore, the laser-scanning microscope is generally constructed so that examination is carried out in a state where the optical axis of the objective lens is orthogonal to the surface of the stage. As a result, it is difficult to carry out examination from an oblique direction with respect to the specimen. Also, it is difficult to carry out examination while the main body of the laser-scanning microscope is tilted with respect to the specimen or while the specimen or the stage is tilted.

BRIEF SUMMARY OF THE INVENTION

In light of the circumstances described above, it is an object of the present invention to provide a laser-scanning microscope that can be made more compact than the laser-scanning microscopes of the related art and that has improved ease of use when carrying out in-vivo examination, particularly of cells, using wavelengths ranging from the visible region to the infra-red region.

In order to realize the above-described object, the present invention provides the following features.

The present invention provides a laser-scanning microscope including a laser light source unit; an optical fiber that transmits excitation light or illumination light from the laser light source unit; a collimator optical system that substantially collimates the excitation light or illumination light from the optical fiber; an optical scanning unit that scans the excitation light or illumination light from the collimator optical system onto a specimen; a pupil projection optical system that images the excitation light or illumination light from the optical scanning unit at an intermediate image position; an objective optical system that re-images the intermediate image of the excitation light or illumination light imaged in the pupil projection optical system onto the specimen; and a detection optical system that detects fluorescence or reflected light emitted from the specimen. The objective optical system can be attached to and removed from the pupil projection optical system in the vicinity of the intermediate image position.

According to the present invention, since the objective optical system can be attached to and removed from the pupil projection optical system close to the intermediate image position, the objective optical system can be separated, which allows it to be left fixed to the examination site. Then, to perform examination again, by connecting the objective optical system to the pupil projection optical system, it is possible to perform examination of the same position at time intervals without moving the objective optical system from the position of the examination site, where it was previously positioned. Since the objective optical system does not move with respect to the examination site, an advantage is afforded in that the object under examination is not disturbed.

By configuring the objective optical system to be attachable and removable close to the intermediate image position, it is possible to easily align the optical axes of the pupil projection optical system and the objective optical system and to easily adjust the inclination angle. Furthermore, by forming an intermediate image with the pupil projection optical system, it is possible to provide an optical system of sufficient length, which allows the objective optical system to be inserted deep inside a living organism.

Preferably, in an aspect of the present invention, when the numerical aperture of laser light emitted from the pupil projection optical system at the intermediate image position is NAp1, the focal length of the pupil projection optical system is Fp1, and the distance between the optical scanning unit and the intermediate image position is Lsf, condition (1) below is satisfied.

$$0.04 \leq |NAp1 \times Fp1/Lsf| \leq 0.1 \tag{1}$$

According to this aspect, if |NAp1×Fp1/Lsf| is smaller than 0.04, the overall length from the optical scanning unit to the tip of the objective optical system is too long, which results in the drawback that the ease-of-use is reduced. In this case, if Lsf is reduced, NAp1×Fp1 is also reduced. In order to achieve a large examination region, it is necessary to increase the scanning angle of the optical scanning unit; however, since off-axis rays deviate substantially from the optical axis in the pupil projection optical system in this case, there is a problem in that it is difficult to correct off-axis aberrations (coma and astigmatism).

If |NAp1×Fp1/Lsf| is larger than 0.1, the optical scanning unit and the pupil projection optical system are too close to each other, and interfere, and it is therefore difficult to position the optical scanning unit. If Lsf is reduced, the beam diameter (=Nap1×Fp1) in the optical scanning unit is increased.

Preferably, in the above-described aspect of the invention, when the objective optical system has a maximum lens diameter Dof within 10 mm of the object side of the objective lens unit and when the distance from the tip at the object side of the objective optical system to the intermediate image position is Lob, conditions (2) and (3) below are satisfied.

$$0.3 \leq |NAp1 \times Fp1/Dof| \leq 4 \quad (2)$$

$$0.04 \leq |NAp1 \times Fp1/Lob| \leq 0.25 \quad (3)$$

According to this configuration, the outer diameter of the objective optical system can be minimized, thus reducing the degree of invasiveness of the object under examination, and it is possible to prevent a reduction in the resolution as well as a reduction in the size of the examination region. Moreover, by keeping the overall length of the objective optical system long, it is possible to carry out examination of a relatively deep examination site. If |NAp1×Fp1/Dof| is smaller than 0.3, the outer diameter of the objective optical system becomes too large, and therefore, it is not possible to access an internal examination site without causing a large degree of invasiveness to the object under examination. If Dof is reduced, NAp1×Fp1 is also reduced, which causes the beam diameter of the optical scanning unit to be reduced. To obtain a large examination region, it is necessary to increase the scanning angle of the optical scanning unit; however, this causes a problem in that it is difficult to correct the off-axis aberrations (coma and astigmatism) because the off-axis beam deviates from the optical axis in the pupil projection optical system.

If |NAp1×Fp1/Dof| is larger than 4, the outer lens diameter is insufficient, and therefore, the numerical aperture is reduced, which results in the drawback that the resolution and the size of the examination region are reduced. If Dof is made smaller, the beam diameter in the optical scanning unit is increased; this causes the optical scanning unit and the collimator lens to increase in size, thus increasing the overall size of the apparatus, and results in the problem that it is difficult to carry out in-vivo examination of a living organism.

If |NAp1×Fp1/Lob| is smaller than 0.04, the overall length of the apparatus becomes too large, which reduces the ease-of-use. Also, if the overall length of the objective optical system is large, off-axis rays deviate substantially from the optical axis, and therefore, it becomes difficult to correct the off-axis aberrations. There is also a problem in that a large outer diameter of the objective optical results in a high degree of invasiveness of the specimen, such as a small experimental animal. If |NAp1×Fp1/Lob| is larger than 0.25, the overall length of the objective optical system becomes too small, which makes it difficult to observe an examination site located deep inside the specimen, and it also becomes difficult to attach it to the pupil projection optical unit. In addition, if the overall length is too short, there is a problem in that it is difficult to correct the aberrations since the number of lenses constituting the objective optical system is limited.

In the above-described aspect, a conjugate position of the optical scanning unit formed by the pupil projection optical system may be located towards the specimen side of a specimen-side focal position of the pupil projection optical system, and, when the distance between the focal position of the pupil projection optical system at the objective-optical-system side and the conjugate position of the optical scanning unit formed by the pupil projection optical system is Lp1, condition (4) below is preferably satisfied.

$$|Fp1/Lp1| \leq 1.3 \quad (4)$$

According to this configuration, it is possible to easily correct the aberrations of the objective optical system and the pupil projection optical system. If |Fp1/Lp1| is larger than 1.3, the intermediate image position and the pupil position (the conjugate position of the optical scanning unit formed by the pupil projection optical system) become too close together and the angle of the off-axis chief ray with respect to the optical axis becomes too large. Therefore, there is a problem in that it is difficult to properly correct the aberrations.

Preferably, in the above described aspect, the pupil projection optical system includes a first lens group having positive refractive power as a whole and including, from the optical scanning unit, at least one compound lens composed of a positive lens and a negative lens; and a second lens group having positive refractive power as a whole, and, when the d-line Abbe number of the positive lens of the lenses in the first lens group is vd, the radius of curvature of the interface surface of the compound lens in the first lens group is Rp1, and the difference in refractive index between the positive lens and the negative lens in the compound lens in the first lens group is Δnd1, conditions (5) and (6) below are preferably satisfied.

$$vd > 80 \quad (5)$$

$$5 < |Rp1/(Fp1 \times \Delta nd1)| < 10 \quad (6)$$

When vd is less than or equal to 80, it is difficult to correct chromatic aberration. When |Rp1/(Fp1×Δnd1)| is less than or equal to 5, spherical aberration is over-corrected, and when it is greater than or equal to 10, spherical aberration is under-corrected, both of which are a problem. According to this configuration, therefore, correction of chromatic aberration is easy, and it is possible to properly correct for spherical aberration.

Furthermore, in the above-described configuration, the second lens group preferably includes at least one compound lens formed of at least two lenses, and, when the radius of curvature of the interface surface of the compound lens in the second lens group is Rp2 and when the difference in refractive index of the at least two lenses constituting the compound lens in the second lens group is Δnd2, condition (7) below is preferably satisfied.

$$0.9 < |Rp2/(Fp1 \times \Delta nd2)| < 2.5 \quad (7)$$

If |Rp2/(Fp1×Δnd2)| is less than or equal to 0.9, coma is under-corrected, and if it is greater or equal to 2.5, coma is over-corrected, both of which are a problem. According to this configuration, therefore, coma can be properly corrected.

Furthermore, in the above-described aspect, the objective optical system may be attachable to and removable from the pupil projection optical system, close to the intermediate image position, while being rotatable with respect thereto.

With this configuration, it is possible to leave the objective optical system attached to the living organism and to couple the objective optical system and the pupil projection to each other without rotating the objective optical system relative to the living organism, regardless of the rotation angle of the pupil projection optical system.

The laser-scanning microscope according to the present invention may comprise a coupling optical system for detection which converges the fluorescence or reflected light emitted from the specimen and an optical fiber for detection which transmits the fluorescence or reflected light which has been converged by the coupling optical system for detection.

With this configuration, an optical system with a high signal-to-noise ratio can be obtained.

Furthermore, in the above configuration, the collimator optical system and the coupling optical system for detection may be a system in common.

In such a case, the scanning unit can be made compact while maintaining a high signal-to-noise ratio.

In the above configuration, the collimator optical system and the coupling optical system for detection may be separate systems, and the core diameter of the optical fiber for detection may be greater than the diffraction limit.

In such a case, the signal-to-nose ratio can be made even higher, and observation of a thick specimen at a deep position from the surface becomes possible.

According to the present invention, by forming an intermediate image with the pupil projection optical system, it is possible to construct a long, thin optical system from the pupil projection optical system to the objective lens. Also, it is possible to realize an objective optical system that maintains a low level of invasiveness up to the examination site located at a certain depth inside the object being examined, such as an experimental animal.

By isolating the laser light source unit and the detection optical unit with the optical fiber, the structure from the collimator optical system to the objective optical system can be made compact, the system components can be more freely positioned as a result of the flexible optical fiber, and the ease-of-use can thus be enhanced. Therefore, this configuration affords an advantage in that examination can be carried out from an arbitrary angle with respect to the examination site by placing the objective optical system in the vicinity thereof.

DETAILED DESCRIPTION OF THE INVENTION

A description of a laser-scanning microscope according to an embodiment of the present invention will be given below, with reference to FIGS. 1 to 5.

Figure 1:
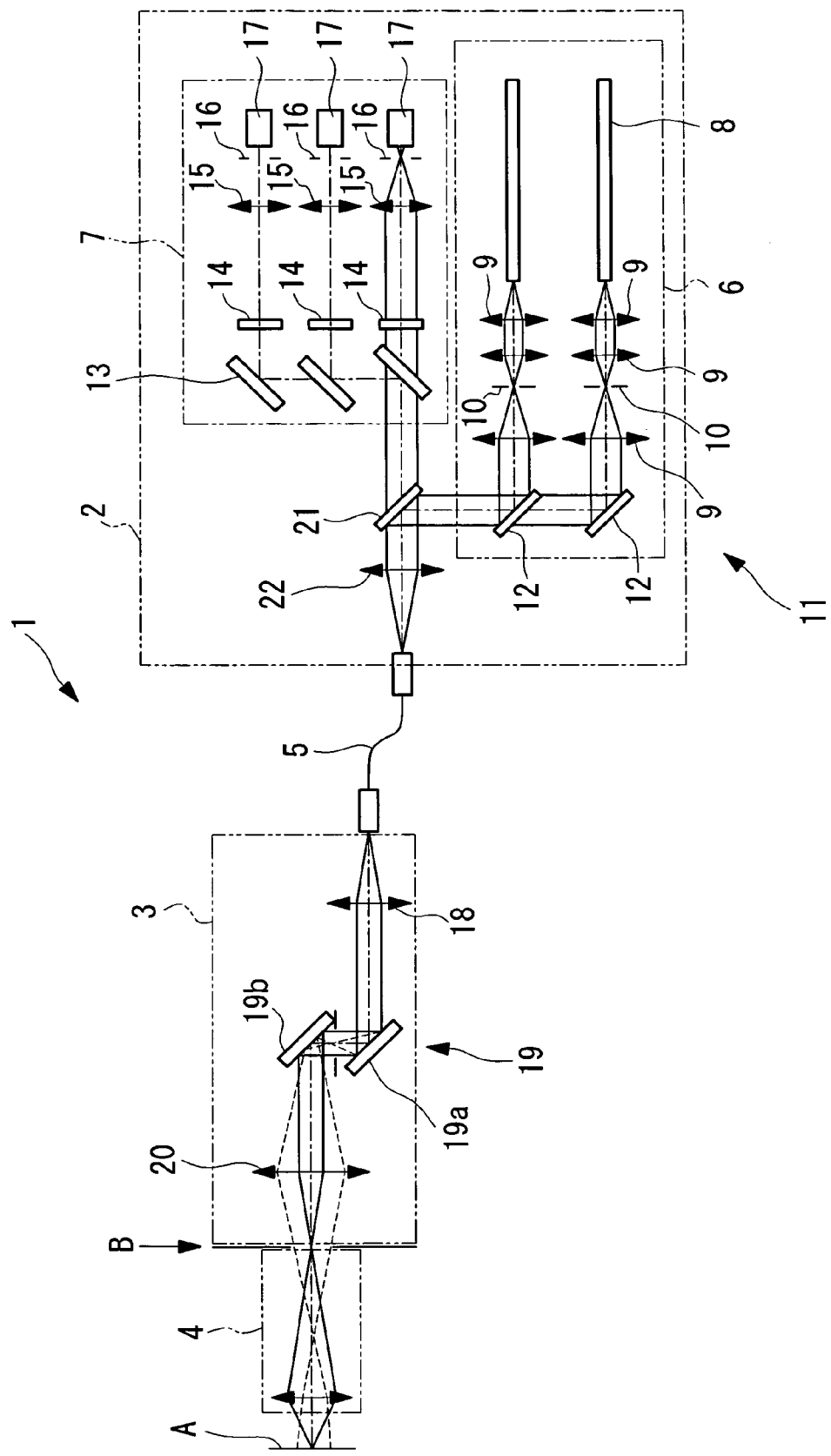
FIG. 1 is a schematic diagram of a laser-scanning microscope according to an embodiment of the present invention.

As shown in FIG. 1, a laser-scanning microscope 1 according to this embodiment includes an optical unit 2, a scanning unit 3, an objective optical system unit 4 attached to the scanning unit 3, and an optical fiber 5 that connects the optical unit 2 and the scanning unit 3.

The optical unit 2 includes a laser light source unit 6 and a detection optical system 7.

The laser light source unit 6 includes laser light sources 8 formed of semiconductor lasers, collimator optical systems 11 formed of lenses 9 and pinholes 10, and dichroic mirrors 12.

As shown in FIG. 1, the detection optical system 7 includes dichroic mirrors 13, barrier filters 14, lenses 15, pinholes 16, and photosensors 17.

The optical fiber 5 transmits excitation light emitted from the laser light source unit 6 and guides fluorescence emitted from a specimen A to the detection optical system 7.

The scanning unit 3 includes a collimator optical system 18 that substantially collimates the excitation light from the optical fiber 5, an optical scanning unit 19 that scans the excitation light from the collimator optical system 18 on the specimen A, and a pupil projection optical system 20 that images the excitation light from the optical scanning unit 19 at an intermediate image position B.

The collimator optical system 18 includes a position adjusting mechanism 25 (see FIG. 4) that can move the collimator lens constituting the collimator optical system 18 in the optical-axis direction.

The optical scanning unit 19 includes two galvano mirrors 19a and 19b that can swing back and forth about orthogonal axes, so as to allow the collimated light emitted from the collimator optical system 18 to be scanned two-dimensionally.

The objective optical unit 4 is configured so as to re-image the excitation-light intermediate image formed in the pupil projection optical system 20 onto the specimen A.

With this configuration, the fluorescence emitted from the specimen A is detected by the photosensors 17 of the detection optical system 7 after passing through the objective optical system unit 4, the pupil projection optical system 20, the optical scanning unit 19, and the collimator optical system 18.

A dichroic mirror 21 for guiding the excitation light from the laser light source unit 6 to the specimen A and for guiding the fluorescence from the specimen A to the photosensors 17 is provided in the optical unit 2. Reference numeral 22 in the figure represents a converging lens.

Figure 2:
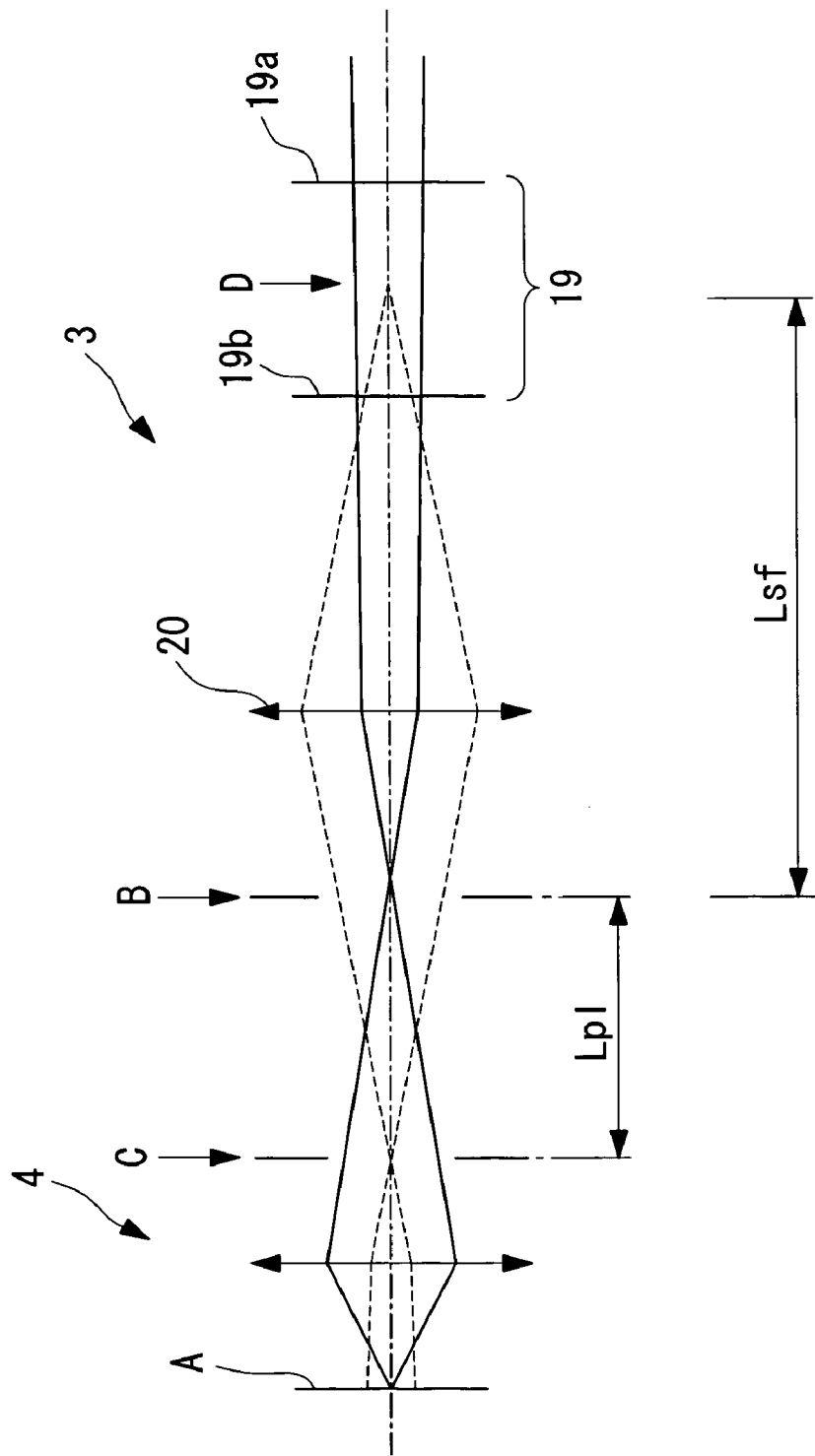
FIG. 2 is a diagram showing the optical path in a pupil projection optical system and an objective optical system of the laser-scanning microscope in FIG. 1.

As shown in FIG. 2, the objective optical system unit 4 is configured so that the rear focal position C thereof is placed in conjugate relation with the vicinity of the central position D between the two galvano mirrors 19a and 19b constituting the optical scanning unit 19 by the pupil projection optical system 20.

Figure 3:
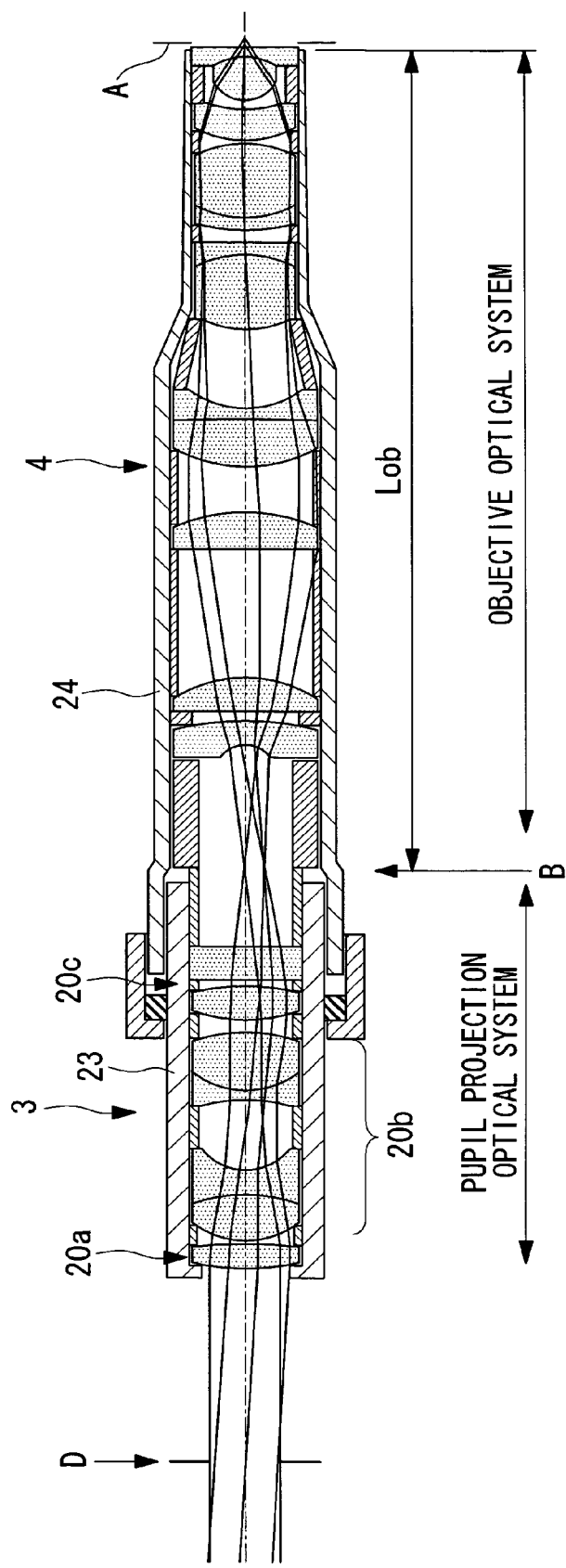
FIG. 3 is a longitudinal sectional view of the pupil projection optical system and the objective optical system in FIG. 2.

As shown in FIG. 3, in the laser-scanning microscope 1 according to this embodiment, the objective optical system unit 4 is configured so that it can be attached to and removed from the scanning unit 3, near the image position B of the intermediate image formed by the pupil projection optical system 20.

More specifically, as shown in FIG. 3, an outer barrel 23 of the pupil projection optical system 20 and an outer barrel 24 of the objective optical system unit 4 are installed so as to abut each other at the intermediate image position B of the pupil projection optical system 20.

A processing and control unit 26 such as a personal computer or the like is connected to the laser-scanning microscope 1. The processing and control unit 26 performs wavelength control of the laser light sources 8, wavelength selection of the dichroic mirrors 12 and 13 and the filters 14, control of a wavelength splitting element (not shown), analysis and display of the detection information detected by the photosensors 17 of the detection optical system 7, driving control of the optical scanning unit 19, and so on.

In the laser-scanning microscope 1 according to this embodiment, the numerical aperture NAp1 of the laser light emitted from the pupil projection optical system 20, at the intermediate image position B of the pupil projection optical system 20, the focal length Fp1 of the pupil projection optical system 20, and the distance Lsf between the optical scanning unit 19 and the intermediate image position B are set so as to satisfy condition (1) below.

$$0.04 \leq |NAp1 \times Fp1/Lsf| \leq 0.1 \quad (1)$$

Also, the maximum lens diameter Dof within 10 mm from the object side of the objective optical system unit 4 and the distance Lob from the object-side end of the objective optical system unit 4 to the intermediate image position B are set so as to satisfy conditions (2) and (3) below.

$$0.3 \leq |NAp1 \times Fp1/Dof| \leq 4 \quad (2)$$

$$0.04 \leq |NAp1 \times Fp1/Lob| \leq 0.25 \quad (3)$$

The distance Lp1 between the focal position of the pupil projection optical system 20, at the objective optical system unit 4 side, and the conjugate position C of the optical scanning unit 19 side, formed by the pupil projection optical system 20, satisfies condition (4) shown below.

$$|Fp1/Lp1| \leq 1.3 \quad (4)$$

The pupil projection optical system 20 is formed, from the optical scanning unit 19 side, of a first lens group 20a having positive refractive power overall, including at least one compound lens formed of a positive lens and a negative lens, and a second lens group 20b having positive refractive power overall, including at least one compound lens. The d-line Abbe number vd of the positive lens in the compound lens of the first lens group 20a, the radius of curvature Rp1 of the interface of the compound lens in the first lens group 20a, the refractive index difference Δnd1 between the positive lens and the negative lens of the compound lens in the first lens group 20a, the radius of curvature Rp2 of the interface of the compound lens in the second lens group 20b, and the refractive index difference Δnd2 of the compound lens in the second lens group are set so as to satisfy conditions (5), (6), and (7) below.

$$vd > 80 \quad (5)$$

$$5 < |Rp1/(Fp1 \times \Delta nd1)| < 10 \quad (6)$$

$$0.9 < |Rp2/(Fp1 \times \Delta nd2)| < 2.5 \quad (7)$$

The function of the laser-scanning microscope 1 according to this embodiment, having such a configuration, will be described below.

With the laser-scanning microscope 1 according to this embodiment, after being converged on the pinhole 10 by the lenses 9, the excitation light emitted from the laser light sources 8 is converted to collimated light by the lenses 9. Thereafter, the light is incident on the dichroic mirrors 12 and 21 and the converging lens 22 to be converged onto the tip of the optical fiber 5, is transmitted through the optical fiber 5, and is introduced to the scanning unit 3. In the scanning unit 3, the light emitted from the end of the optical fiber 5 is converted into collimated light by the collimator optical system 18 and is made incident on the optical scanning unit 19, and then the beam is deflected in two dimensions with respect to the optical axis by rotating each galvano mirror 19a and 19b of the optical scanning unit 19. The light is then converged, via the pupil projection optical system 20, at the intermediate image position B to form an image. The excitation light converged at the intermediate image position B then passes through the objective optical system unit 4 to illuminate a minute spot on the specimen A. At this time, the excitation light illuminating the surface of the specimen A is scanned by the optical scanning unit 19.

Fluorescence excited by illuminating the specimen A with excitation light passes through the objective optical system unit 4, the pupil projection optical system 20, the optical scanning unit 19, the collimator optical system 18, the optical fiber 5, the converging lens 22, and the dichroic mirror 21, and is introduced to the detection optical system 7. Then, in the detection optical system 7, after passing through the dichroic mirrors 13, the barrier filters 14, and the lenses 15, only the fluorescence transmitted through the pinholes 16 is detected by the photosensors 17.

In this case, with the laser-scanning microscope 1 according to this embodiment, since an intermediate image is formed between the pupil projection optical system 20 and the objective optical system unit 4 by the pupil projection optical system 20, it is possible to set the length of the optical system from the pupil projection optical system 20 to the end of the objective optical system unit 4 to be sufficiently large and to set the thickness thereof to be sufficiently small. As a result, the outer diameter of the outer barrel 24 of the objective optical system unit 4 is kept small, which removes the need to make a large incision in small experimental animals and so on. Therefore, the tip of the objective optical system unit 4 can reach the examination site of an internal organ (specimen) A located deep inside the body, in a low-invasive manner without causing any significant damage to the small experimental animal or the like.

Also, with the laser-scanning microscope according to this embodiment, since the objective optical system unit 4 is disposed at the intermediate image position B formed by the pupil projection optical system 20 so as to be attachable and removable, when compared to the case where it is attached and removed at locations other than the intermediate image position B, there is no need to carry out precise alignment of the optical axes or precise adjustment of tilting of the optical axes. Therefore, comparatively straightforward adjustment is possible, and as a result, an advantage is provided in that it is possible to improve the quality of the images obtained.

Figure 4:
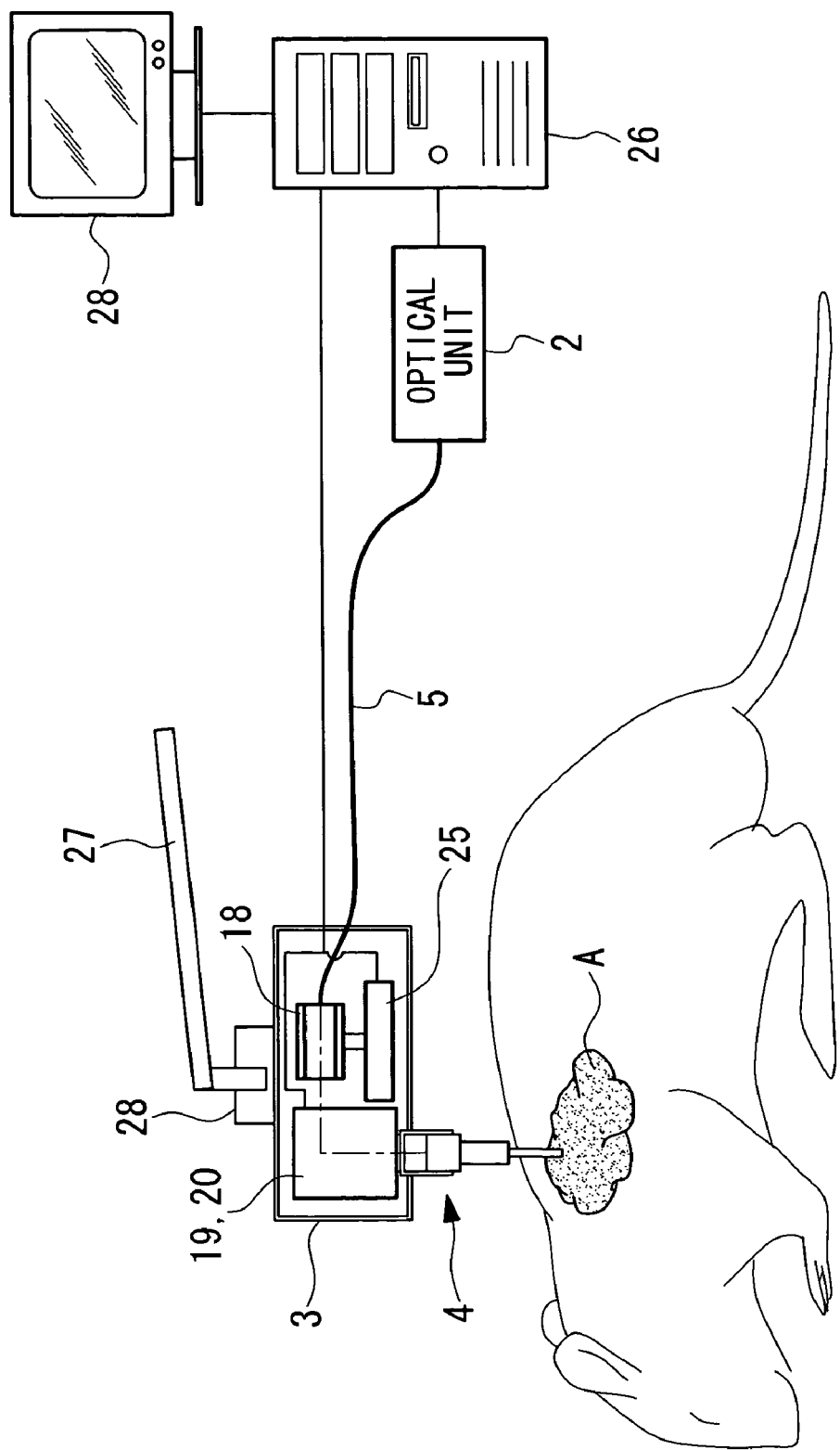
FIG. 4 is a diagram showing an example of an application of the laser-scanning microscope in FIG. 1.
Figure 5:
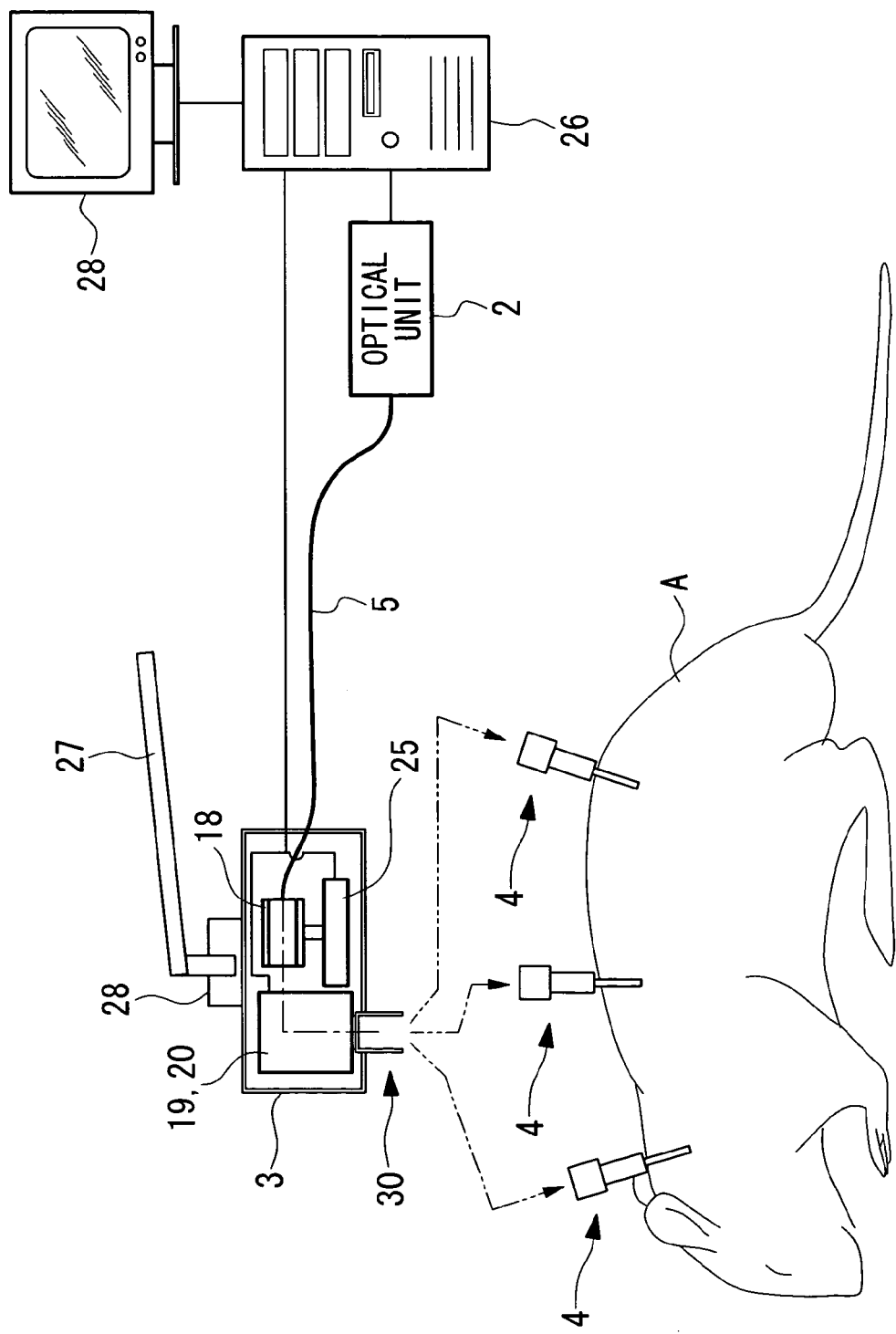
FIG. 5 is a similar diagram to that in FIG. 4.

Furthermore, since the optical unit 2 and the scanning unit 3 are connected by the optical fiber 5, it is possible to design the scanning unit 3 to have a compact configuration. As a result, the optical fiber 5 can be bent freely to allow the position and inclination of the scanning unit 3 to be freely changed, which affords an advantage in that it is easy to reposition the system components. For example, as shown in FIG. 4 and FIG. 5, the scanning unit 3 is attached to the end of an arm 27, which is attached to a stand (not shown), and by changing the inclination and so on of the arm 27, the scanning unit 3 and the objective optical system unit 4 can be set in an arbitrary position for examination. Also, a fine adjustment mechanism 28 may be disposed between the arm 27 and the scanning unit 3; the position of the scanning unit 3 is coarsely adjusted by moving the arm 27 and is finely adjusted by actuating the fine adjustment mechanism 28. Reference numeral 29 in the drawings represents a display for displaying images.

Furthermore, as shown in FIG. 5, the objective optical system unit 4 may be isolated from the scanning unit 3 and kept in position at the examination site of a small experimental animal A serving as the object under examination, and by moving the arm 27 and the scanning unit 3 in this state, the scanning unit 3 may be positioned at various objective optical system units 4 and connected thereto for carrying out examination. With this arrangement, it is possible to carry out examination at the same position without removing the objective optical system unit 4, which was previously positioned with respect to the examination site. Also, it is possible to carry out examination without disturbing the examination site.

In this case, when connecting the objective optical system unit 4 and the scanning unit 3, a connection mechanism 30 of the objective optical system unit 4 for connecting to the scanning unit 3 is preferably configured so as to allow them to be coupled without relative rotation about the axes thereof. Therefore, it is possible to connect them as is without rotating the objective optical system unit 4 positioned on the specimen A, regardless of the rotation angle of the scanning unit 3. As a result, there is an advantage in that no damage is caused to the specimen A. In addition to a screw fastening mechanism, various mechanisms can be used as the connection mechanism 30, including a clamp-type mechanism in which the objective optical system unit 4 and the scanning unit 3 are fitted together and pushed with a screw from the outer radial direction, a mechanism in which a tapered screw is formed in the outer surface of a slotted sleeve and tightened by a nut fastener, a spigot-mount mechanism, a bayonet mechanism, a magnetic-fastening mechanism, and so forth.

The pinholes 16 are provided in order to eliminate unnecessary light such as scattered excitation light.

The laser-scanning microscope 1 according to this embodiment is designed so as to satisfy conditions (1) to (7).

By satisfying condition (1), an advantage is afforded in that the ease-of-use is improved and off-axis aberrations (coma and astigmatism) can be easily corrected.

Also, interference caused by bringing the scanning unit and the pupil projection optical system too close together can be prevented, which facilitates positioning of the optical scanning unit.

By satisfying condition (2), the outer diameter of the objective optical system can be minimized, which allows low-invasive examination of an object, and it is possible to prevent a decrease in resolving power and a reduction in the size of the examination region. Also, the overall length of the objective optical system can be made long enough so that an examination site located deep inside the object can be examined. Furthermore, it is possible to easily correct off-axis aberrations (coma and astigmatism).

Moreover, a reduction in numerical aperture can be prevented, which increases the resolving power, thus ensuring examination of a wide examination region. In addition, the beam diameter in the scanning unit is reduced, which allows the sizes of the scanning unit and the collimator lens to be reduced, thus also reducing the size of the entire apparatus. Therefore, in vivo examination is facilitated.

By satisfying condition (3), off-axis aberrations can easily be corrected and the outer diameter of the objective optical system can be reduced, which allows low-invasive examination of a specimen such as a small experimental animal. Also, the overall length is increased, which allows a large number of lenses to be used for the objective optical system, thus facilitating correction of aberrations.

By satisfying condition (4), it is possible to easily correct the aberrations of the objective optical system and the pupil projection optical system. The intermediate image position and the pupil position (the conjugate position of the optical scanning unit, formed by the pupil projection optical system) are prevented from coming too close together, which makes it possible to easily correct aberrations.

Also, by satisfying conditions (5) to (7), chromatic aberrations can be easily corrected, and it is possible to prevent over-correction and under-correction of spherical aberration and coma.

Examples of the collimator optical system 18, the pupil projection optical system 20, and the objective optical system unit 4 of the laser-scanning microscope 1 according to this embodiment will be described below.

Figure 6:
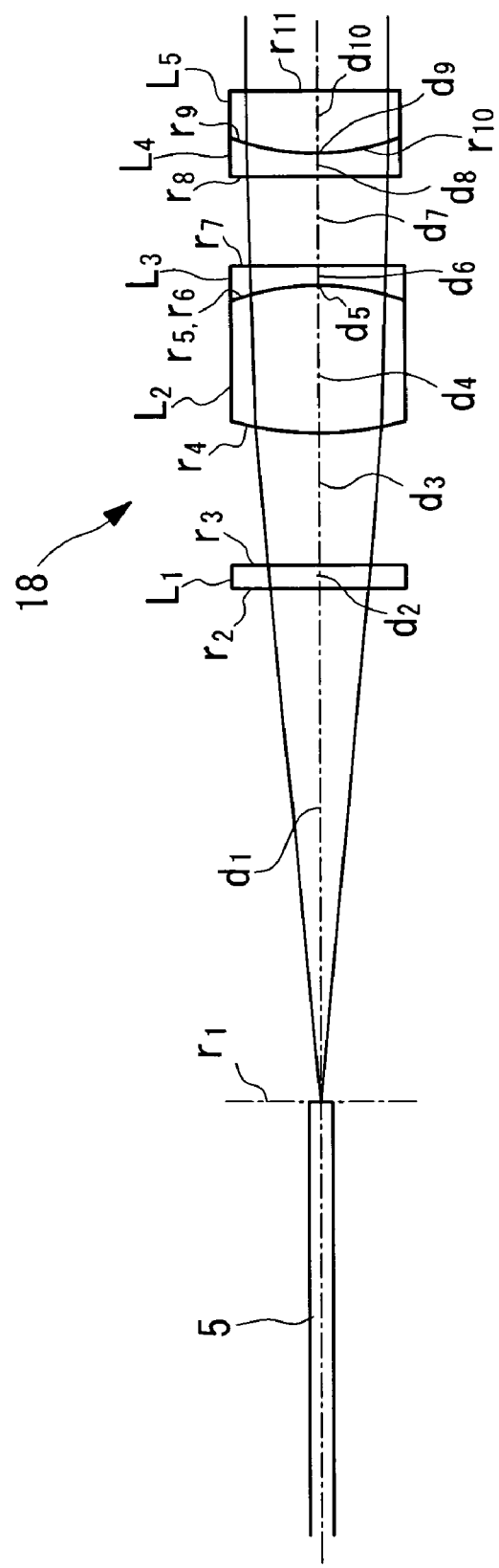
FIG. 6 is a diagram, taken along the optical axis, showing the configuration of a collimator optical system according to an embodiment of the present invention.

FIG. 6 is a cross-sectional view, taken along the optical axis, showing the configuration of the collimator optical system 18.

From the tip of the optical fiber 5, this collimator optical system 18 includes, in the following order on the optical axis thereof, a flat plate $L_1$, a positive compound lens composed of a biconvex lens $L_2$ and a negative meniscus lens whose concave surface faces the biconvex lens $L_2$, and a positive compound lens $L_3$ composed of a negative meniscus lens $L_4$ whose convex surface faces the tip of the optical fiber 5 and a biconvex lens $L_5$.

The specification data of each of the optical elements $L_1$ to $L_5$ composing the collimator optical system 18 are shown below. In this specification data, r represents the radius of curvature of each of the lenses $L_1$ to $L_5$, d represents the thickness or spacing of each of the lenses $L_1$ to $L_5$, nd represents the refractive index of each of the lenses $L_1$ to $L_5$ at the d-line, and vd represents the Abbe number of each of the lenses $L_1$ to $L_5$. The first surface is the position of the tip of the optical fiber 5. The focal length is 16.01 mm and the pupil diameter is 3 mm.

| Specification data | | | |
|---|---|---|---|
| $r_1 = \infty$ | $d_1 = 10.86$ | | |
| $r_2 = \infty$ | $d_2 = 0.5$ | $nd_2 = 1.51825$ | $vd_2 = 64.14$ |
| $r_3 = \infty$ | $d_3 = 2.9$ | | |
| $r_4 = 9.231$ | $d_4 = 3$ | $nd_4 = 1.43985$ | $vd_4 = 94.93$ |
| $r_5 = -6.1$ | $d_5 = 0.012$ | $nd_5 = 1.5675$ | $vd_5 = 43.79$ |
| $r_6 = -6.1$ | $d_6 = 0.5$ | $nd_6 = 1.51825$ | $vd_6 = 64.14$ |
| $r_7 = -60.898$ | $d_7 = 1.81$ | | |

-continued

| Specification data | | | |
|---|---|---|---|
| $r_8 = 20.878$ | $d_8 = 0.5$ | $nd_8 = 1.68082$ | $vd_8 = 55.34$ |
| $r_9 = 5.534$ | $d_9 = 0.012$ | $nd_9 = 1.5675$ | $vd_9 = 43.79$ |
| $r_{10} = 5.534$ | $d_{10} = 1.37$ | $nd_{10} = 1.48915$ | $vd_{10} = 70.23$ |
| $r_{11} = -18.561$ | | | |

EXAMPLE 1

Figure 7:
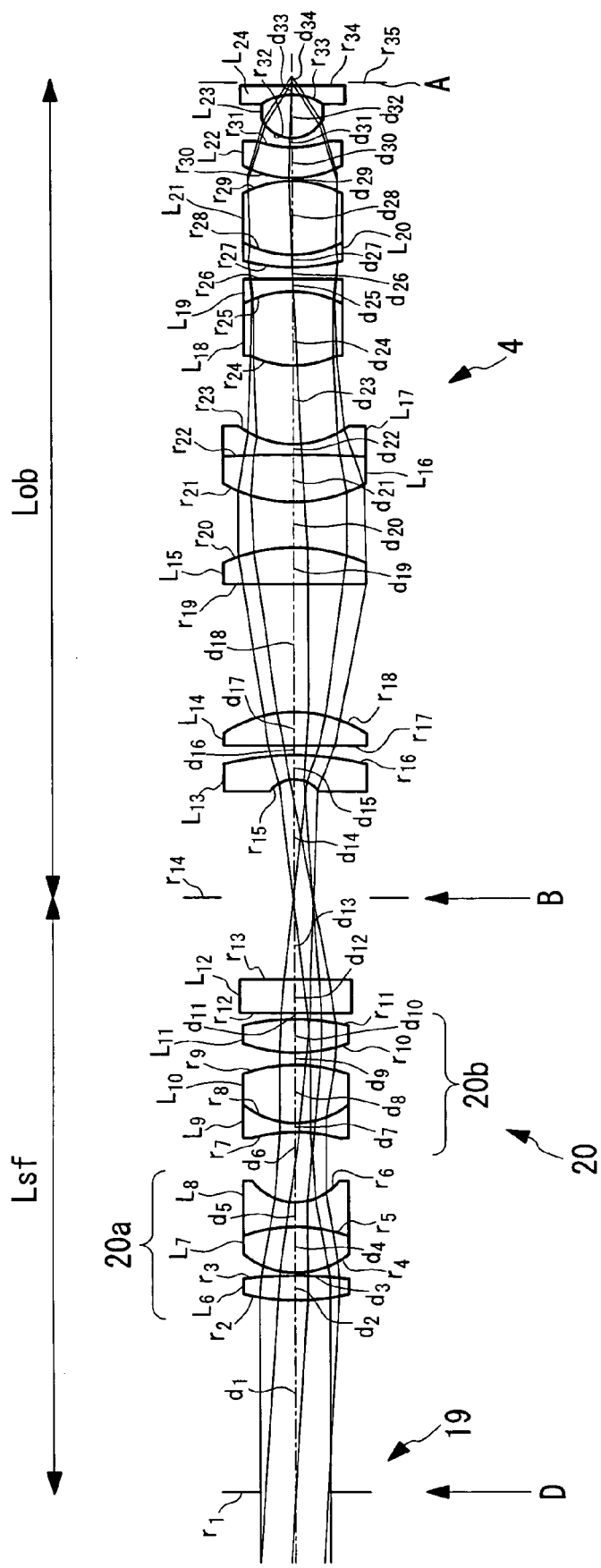
FIG. 7 is a diagram, taken along the optical axis, showing the configuration of the pupil projection optical system and the objective optical system according to a first example of the present invention.

FIG. 7 is a cross-sectional view, taken along the optical axis, showing the configuration of a first example of the pupil projection optical system 20 and the objective optical system unit 4.

The pupil projection optical system 20 includes a first lens group 20a formed of a biconvex lens $L_6$ and a negative compound lens, composed of a biconvex lens $L_7$ and a biconcave lens $L_8$, and whose concave surface faces the optical scanning unit 19; a second lens group 20b formed of a positive compound lens, composed of a biconcave lens $L_9$ and a biconvex lens $L_{10}$, whose concave surface faces the optical scanning unit 19 and a biconvex lens $L_{11}$; and a flat plate $L_{12}$. The flat plate $L_{12}$ functions as a window member for protecting the pupil projection optical system 20 when the objective lens unit 4 is separated from the pupil projection optical system 20.

The objective optical system unit 4 includes a negative meniscus lens $L_{13}$ whose concave surface faces the pupil projection optical system 20; a plano-convex lens $L_{14}$ whose flat surface faces the pupil projection optical system 20; a plano-convex lens $L_{15}$ whose flat surface faces the pupil projection optical system 20; a negative compound lens, composed of a biconvex lens $L_{16}$ and a biconcave lens $L_{17}$, whose convex surface faces the pupil projection optical system 20; a positive compound lens composed of a biconvex lens $L_{18}$ and a negative meniscus lens $L_{19}$ whose concave surface faces the pupil projection optical system 20; a positive compound lens composed of a negative meniscus lens $L_{20}$ whose convex surface faces the pupil projection optical system 20 and a biconvex lens $L_{21}$; a positive meniscus lens $L_{22}$ whose convex surface faces the pupil projection optical system 20; a biconvex lens $L_{23}$; and a plano-concave lens $L_{24}$ whose concave surface faces the pupil projection optical system 20.

The specification data of the lenses $L_6$ to $L_{24}$ forming the optical system of the first example is shown below.

| Specification data | | | |
|---|---|---|---|
| $r_1 = \infty$ | $d_1 = 8$ | | |
| $r_2 = 9.111$ | $d_2 = 1$ | $nd_2 = 1.43875$ | $vd_2 = 94.93$ |
| $r_3 = -21.275$ | $d_3 = 0.11$ | | |
| $r_4 = 3.469$ | $d_4 = 2$ | $nd_4 = 1.43875$ | $vd_4 = 94.93$ |
| $r_5 = -6.881$ | $d_5 = 1$ | $nd_5 = 1.51633$ | $vd_5 = 64.14$ |
| $r_6 = 2.339$ | $d_6 = 2.98$ | | |
| $r_7 = -5.805$ | $d_7 = 0.32$ | $nd_7 = 1.6779$ | $vd_7 = 55.34$ |
| $r_8 = 3.3$ | $d_8 = 2.5$ | $nd_8 = 1.497$ | $vd_8 = 81.54$ |
| $r_9 = -6.115$ | $d_9 = 0.5$ | | |
| $r_{10} = 5.191$ | $d_{10} = 1.5$ | $nd_{10} = 1.497$ | $vd_{10} = 81.54$ |
| $r_{11} = -8.003$ | $d_{11} = 0.14$ | | |
| $r_{12} = \infty$ | $d_{12} = 1.5$ | $nd_{12} = 1.7725$ | $vd_{12} = 49.6$ |
| $r_{13} = \infty$ | $d_{13} = 3.45$ | | |
| $r_{14} = \infty$ | $d_{14} = 5.14$ | | |
| $r_{15} = -1.353$ | $d_{15} = 1$ | $nd_{15} = 1.51633$ | $vd_{15} = 64.14$ |
| $r_{16} = -10.001$ | $d_{16} = 0.3$ | | |
| $r_{17} = \infty$ | $d_{17} = 1.45$ | $nd_{17} = 1.6779$ | $vd_{17} = 55.34$ |

-continued

| Specification data | | | |
|---|---|---|---|
| $r_{18} = -5.135$ | $d_{18} = 5.49$ | | |
| $r_{19} = \infty$ | $d_{19} = 1.52$ | $nd_{19} = 1.43875$ | $vd_{19} = 94.93$ |
| $r_{20} = -6.422$ | $d_{20} = 1.96$ | | |
| $r_{21} = 6.181$ | $d_{21} = 2$ | $nd_{21} = 1.6779$ | $vd_{21} = 55.34$ |
| $r_{22} = -40.05$ | $d_{22} = 0.5$ | $nd_{22} = 1.6134$ | $vd_{22} = 44.27$ |
| $r_{23} = 4.296$ | $d_{23} = 3.21$ | | |
| $r_{24} = 6.353$ | $d_{24} = 3.2$ | $nd_{24} = 1.43875$ | $vd_{24} = 94.93$ |
| $r_{25} = -2.744$ | $d_{25} = 0.5$ | $nd_{25} = 1.7725$ | $vd_{25} = 49.6$ |
| $r_{26} = -35.645$ | $d_{26} = 0.5$ | | |
| $r_{27} = 7.004$ | $d_{27} = 0.56$ | $nd_{27} = 1.7725$ | $vd_{27} = 49.6$ |
| $r_{28} = 3.902$ | $d_{28} = 2.95$ | $nd_{28} = 1.43875$ | $vd_{28} = 94.93$ |
| $r_{29} = -3.902$ | $d_{29} = 0.11$ | | |
| $r_{30} = 3.201$ | $d_{30} = 1.54$ | $nd_{30} = 1.43875$ | $vd_{30} = 94.93$ |
| $r_{31} = 7.204$ | $d_{31} = 0.26$ | | |
| $r_{32} = 1.444$ | $d_{32} = 1.89$ | $nd_{32} = 1.43875$ | $vd_{32} = 94.93$ |
| $r_{33} = -1.739$ | $d_{33} = 0.31$ | $nd_{33} = 1.51633$ | $vd_{33} = 64.14$ |
| $r_{34} = \infty$ | $d_{34} = 0.2005$ | $nd_{34} = 1.33304$ | $vd_{34} = 55.79$ |
| $r_{35} = \infty$ | | | |

EXAMPLE 2

Figure 8:
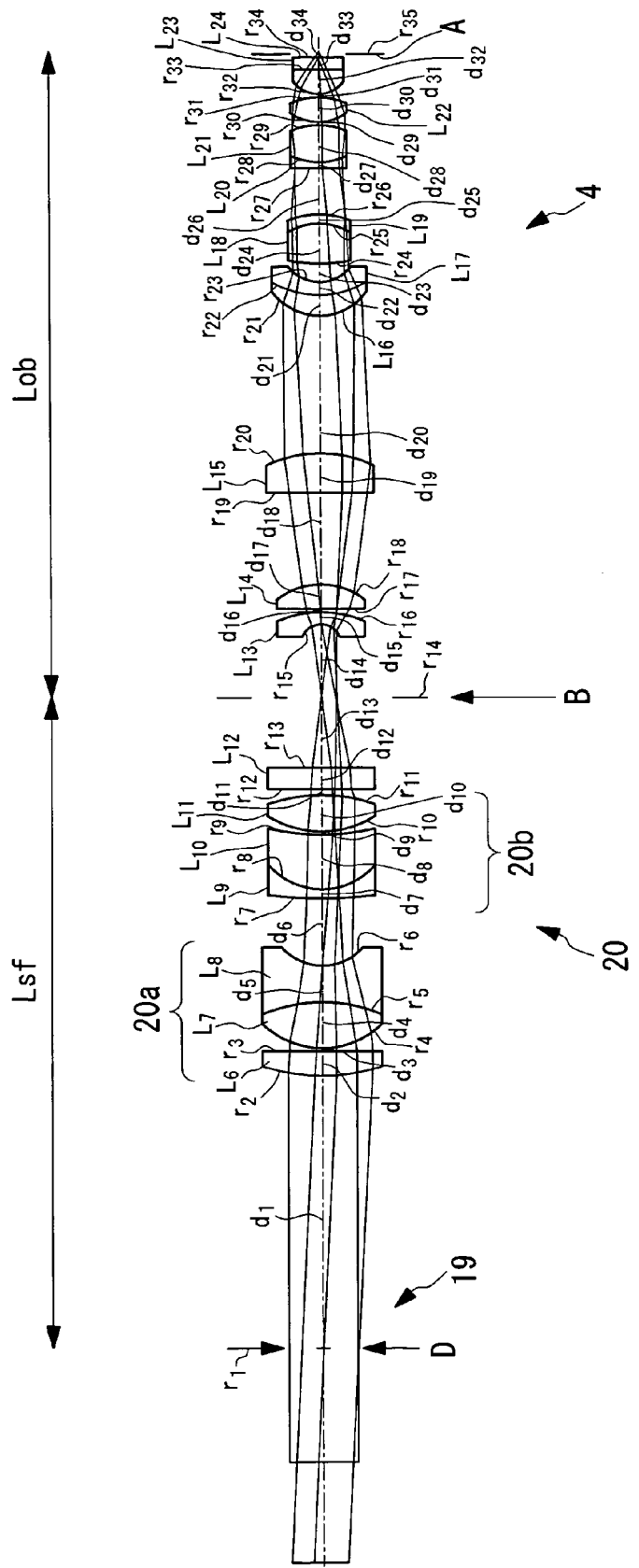
FIG. 8 is a diagram, taken along the optical axis, showing the configuration of the pupil projection optical system and the objective optical system according to a second example of the present invention.

FIG. 8 is a cross-sectional view, taken along the optical axis, showing the configuration of a second example of the pupil projection optical system 20 and the objective optical system unit 4.

The pupil projection optical system 20 includes a first lens group 20a formed of a biconvex lens $L_6$ and negative compound lens, composed of a biconvex lens $L_7$ and a biconcave lens $L_8$, whose convex surface faces the optical scanning unit 19; a second lens group 20b formed of a compound lens composed of a negative meniscus lens $L_9$ and a positive meniscus lens $L_{10}$ whose convex surfaces face the optical scanning unit 19 and a biconvex lens $L_{11}$; and a flat plate $L_{12}$. The flat plate $L_{12}$ functions as a window member that protects the pupil projection optical system 20 when the objective optical system unit 4 is separated from the pupil projection optical system 20.

The objective optical system unit 4 includes a negative meniscus lens $L_{13}$ whose concave surface faces the pupil projection optical system 20, a plano-convex lens $L_{14}$ whose flat surface faces the pupil projection optical system 20, a plano-convex lens $L_{15}$ whose flat surface faces the pupil projection optical system 20, a compound lens composed of a positive meniscus lens $L_{16}$ and a negative meniscus lens $L_{17}$ whose convex surfaces face the pupil projection optical system 20, a positive compound lens composed of a biconvex lens $L_{18}$ and a negative meniscus lens $L_{19}$ whose concave surface faces the pupil projection optical system 20, a positive compound lens composed of a negative meniscus lens $L_{20}$ whose convex surface faces the pupil projection optical system 20 and a biconvex lens $L_{21}$, and a compound lens composed of a plano-convex lens $L_{23}$ whose convex surface faces the pupil projection optical system 20 and a flat plate $L_{24}$.

The specification data of the optical elements forming the optical system of the second example is shown below.

| Specification Data | | | |
|---|---|---|---|
| $r_1 = \infty$ | $d_1 = 12$ | | |
| $r_2 = 11.02$ | $d_2 = 1$ | $nd_2 = 1.43875$ | $vd_2 = 94.93$ |
| $r_3 = -38.4828$ | $d_3 = 0.1$ | | |
| $r_4 = 3.5857$ | $d_4 = 2$ | $nd_4 = 1.43875$ | $vd_4 = 94.93$ |

-continued

Specification Data

| | | | |
|---|---|---|---|
| $r_5 = -6.9665$ | $d_5 = 1.55$ | $nd_5 = 1.51633$ | $vd_5 = 64.14$ |
| $r_6 = 2.339$ | $d_6 = 2.98$ | | |
| $r_7 = 18.7454$ | $d_7 = 0.4$ | $nd_7 = 1.6779$ | $vd_7 = 55.34$ |
| $r_8 = 2.9519$ | $d_8 = 2.5$ | $nd_8 = 1.497$ | $vd_8 = 81.54$ |
| $r_9 = 17.1965$ | $d_9 = 0.1$ | | |
| $r_{10} = 4.1138$ | $d_{10} = 1.5$ | $nd_{10} = 1.497$ | $vd_{10} = 81.54$ |
| $r_{11} = -8.0159$ | $d_{11} = 0.29$ | | |
| $r_{12} = \infty$ | $d_{12} = 1$ | $nd_{12} = 1.51633$ | $vd_{12} = 64.14$ |
| $r_{13} = \infty$ | $d_{13} = 3.15$ | | |
| $r_{14} = \infty$ | $d_{14} = 3.19$ | | |
| $r_{15} = -0.874$ | $d_{15} = 0.55$ | $nd_{15} = 1.6134$ | $vd_{15} = 44.27$ |
| $r_{16} = -5.469$ | $d_{16} = 0.1$ | | |
| $r_{17} = \infty$ | $d_{17} = 1.1$ | $nd_{17} = 1.741$ | $vd_{17} = 52.64$ |
| $r_{18} = -2.744$ | $d_{18} = 3.91$ | | |
| $r_{19} = \infty$ | $d_{19} = 1.83$ | $nd_{19} = 1.43875$ | $vd_{19} = 94.93$ |
| $r_{20} = -5.434$ | $d_{20} = 6.03$ | | |
| $r_{21} = 2.439$ | $d_{21} = 1.09$ | $nd_{21} = 1.6779$ | $vd_{21} = 55.34$ |
| $r_{22} = 9.44$ | $d_{22} = 0.3$ | $nd_{22} = 1.6134$ | $vd_{22} = 44.27$ |
| $r_{23} = 1.686$ | $d_{23} = 0.89$ | | |
| $r_{24} = 4.995$ | $d_{24} = 1.75$ | $nd_{24} = 1.43875$ | $vd_{24} = 94.93$ |
| $r_{25} = -1.667$ | $d_{25} = 0.3$ | $nd_{25} = 1.7725$ | $vd_{25} = 49.6$ |
| $r_{26} = -3.937$ | $d_{26} = 2$ | | |
| $r_{27} = -77.074$ | $d_{27} = 0.31$ | $nd_{27} = 1.7725$ | $vd_{27} = 49.6$ |
| $r_{28} = 2.32$ | $d_{28} = 1.62$ | $nd_{28} = 1.43875$ | $vd_{28} = 94.93$ |
| $r_{29} = -2.32$ | $d_{29} = 0.13$ | | |
| $r_{30} = 2.32$ | $d_{30} = 1$ | $nd_{30} = 1.43875$ | $vd_{30} = 94.93$ |
| $r_{31} = -5.741$ | $d_{31} = 0.1$ | | |
| $r_{32} = 1.108$ | $d_{32} = 1.09$ | $nd_{32} = 1.43875$ | $vd_{32} = 94.93$ |
| $r_{33} = \infty$ | $d_{33} = 0.49$ | $nd_{33} = 1.51633$ | $vd_{33} = 64.14$ |
| $r_{34} = \infty$ | $d_{34} = 0.05$ | $nd_{34} = 1.33304$ | $vd_{34} = 55.79$ |
| $r_{35} = \infty$ | | | |

EXAMPLE 3

Figure 9:
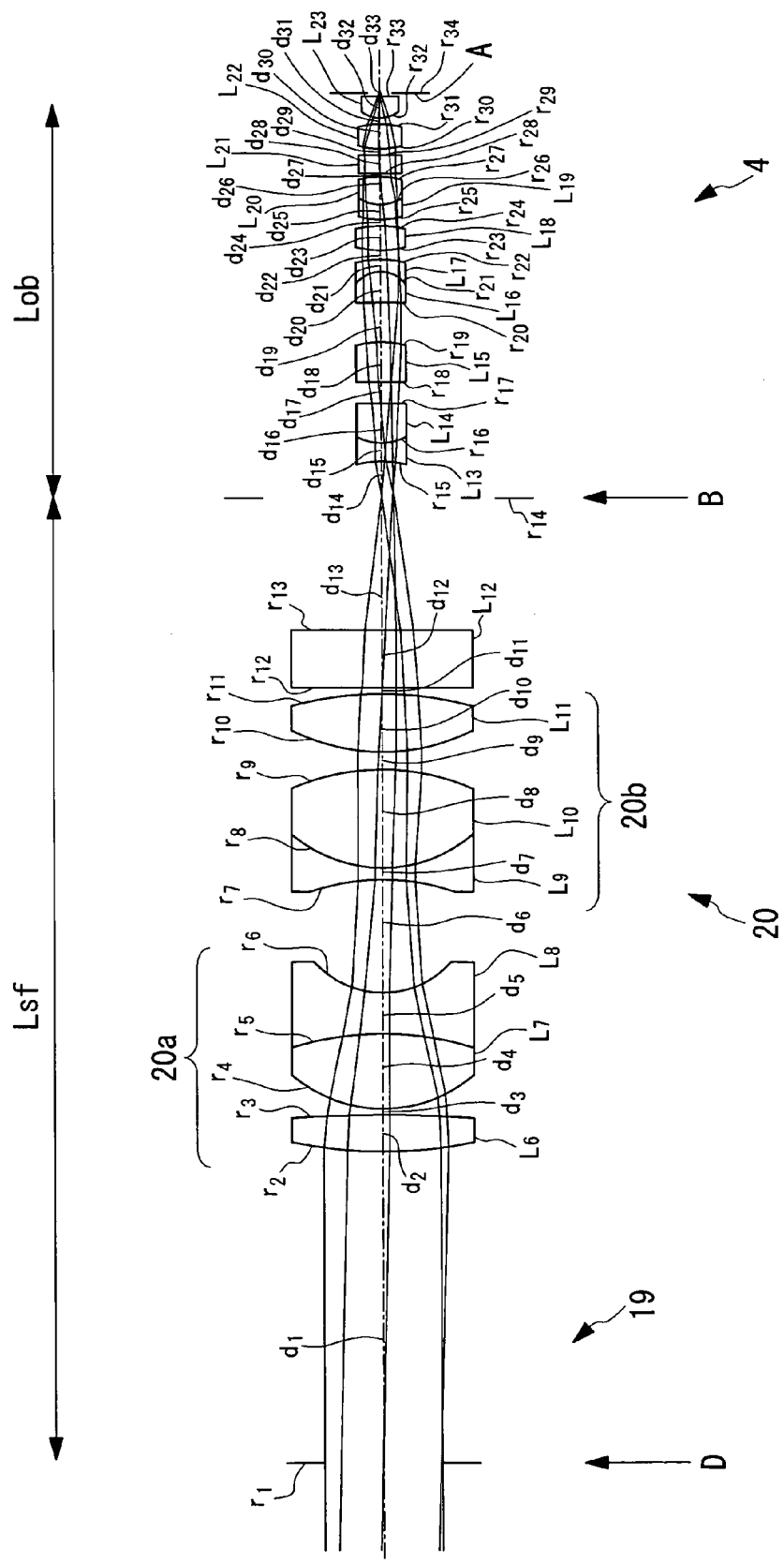
FIG. 9 is a diagram, taken along the optical axis, showing the configuration of the pupil projection optical system and the objective optical system according to a third example of the present invention.

FIG. 9 is a cross-section, taken along the optical axis, showing the configuration of a third example of the pupil projection optical system 20 and the objective optical system unit 4.

The pupil projection optical system 20 includes a first lens group 20a formed of a biconvex lens $L_6$ and a negative compound lens, composed of a biconvex lens $L_7$ and a biconcave lens $L_8$, whose convex surface faces the optical scanning unit 19; a second lens group 20b formed of a positive compound lens, composed of a biconcave lens $L_9$ and a biconvex lens $L_{10}$, whose concave surface faces the optical scanning unit 19, and a biconvex lens $L_{11}$; and a flat plate $L_{12}$. The flat plate $L_{12}$ functions as a window member that protects the pupil projection optical system 20 when the objective lens optical system unit 4 is separated from the pupil projection optical system 20.

The objective optical system unit 4 includes a compound lens composed of a biconcave lens $L_{13}$ and a plano-convex lens $L_{14}$; a plano-convex lens $L_{15}$ whose flat surface faces the pupil projection optical system 20; a compound lens, composed of a plano-convex lens $L_{16}$ and a negative meniscus lens $L_{17}$, whose flat surface faces the pupil projection optical system 20; a biconvex lens $L_{18}$; a positive compound lens, composed of a negative meniscus lens $L_{19}$ and a biconvex lens $L_{20}$, whose convex surface faces the pupil projection optical system 20; a plano-concave lens $L_{21}$ whose concave surface faces the pupil projection optical system 20; a biconvex lens $L_{22}$; and a plano-convex lens $L_{23}$ whose convex surface faces the pupil projection optical system 20.

The specification data of the optical elements forming the optical system of the third example is shown below.

Specification data

| | | | |
|---|---|---|---|
| $r_1 = \infty$ | $d_1 = 8$ | | |
| $r_2 = 9.111$ | $d_2 = 1$ | $nd_2 = 1.43875$ | $vd_2 = 94.93$ |
| $r_3 = -21.275$ | $d_3 = 0.11$ | | |
| $r_4 = 3.469$ | $d_4 = 2$ | $nd_4 = 1.43875$ | $vd_4 = 94.93$ |
| $r_5 = -6.881$ | $d_5 = 1$ | $nd_5 = 1.51633$ | $vd_5 = 64.14$ |
| $r_6 = 2.339$ | $d_6 = 2.98$ | | |
| $r_7 = -5.805$ | $d_7 = 0.32$ | $nd_7 = 1.6779$ | $vd_7 = 55.34$ |
| $r_8 = 3.3$ | $d_8 = 2.5$ | $nd_8 = 1.497$ | $vd_8 = 81.54$ |
| $r_9 = -6.115$ | $d_9 = 0.5$ | | |
| $r_{10} = 5.191$ | $d_{10} = 1.5$ | $nd_{10} = 1.497$ | $vd_{10} = 81.54$ |
| $r_{11} = -8.003$ | $d_{11} = 0.14$ | | |
| $r_{12} = \infty$ | $d_{12} = 1.5$ | $nd_{12} = 1.7725$ | $vd_{12} = 49.6$ |
| $r_{13} = \infty$ | $d_{13} = 3.45$ | | |
| $r_{14} = \infty$ | $d_{14} = 0.95$ | | |
| $r_{15} = -1.869$ | $d_{15} = 0.5$ | $nd_{15} = 1.51633$ | $vd_{15} = 64.14$ |
| $r_{16} = 1.425$ | $d_{16} = 1$ | $nd_{16} = 1.7725$ | $vd_{16} = 49.6$ |
| $r_{17} = \infty$ | $d_{17} = 0.56$ | | |
| $r_{18} = \infty$ | $d_{18} = 1$ | $nd_{18} = 1.7725$ | $vd_{18} = 49.6$ |
| $r_{19} = -3.746$ | $d_{19} = 1.03$ | | |
| $r_{20} = 10.104$ | $d_{20} = 0.8$ | $nd_{20} = 1.6779$ | $vd_{20} = 55.34$ |
| $r_{21} = -0.804$ | $d_{21} = 0.34$ | $nd_{21} = 1.7725$ | $vd_{21} = 49.6$ |
| $r_{22} = -5.961$ | $d_{22} = 0.2$ | | |
| $r_{23} = 2.681$ | $d_{23} = 0.7$ | $nd_{23} = 1.51633$ | $vd_{23} = 64.14$ |
| $r_{24} = -2.406$ | $d_{24} = 0.2$ | | |
| $r_{25} = -2.406$ | $d_{25} = 0.29$ | $nd_{25} = 1.6134$ | $vd_{25} = 44.27$ |
| $r_{26} = 0.674$ | $d_{26} = 0.7$ | $nd_{26} = 1.43875$ | $vd_{26} = 94.93$ |
| $r_{27} = -1.218$ | $d_{27} = 0.15$ | | |
| $r_{28} = -3.637$ | $d_{28} = 0.45$ | $nd_{28} = 1.6134$ | $vd_{28} = 44.27$ |
| $r_{29} = \infty$ | $d_{29} = 0.15$ | | |
| $r_{30} = 1.273$ | $d_{30} = 0.6$ | $nd_{30} = 1.741$ | $vd_{30} = 52.64$ |
| $r_{31} = -3.469$ | $d_{31} = 0.15$ | | |
| $r_{32} = 0.614$ | $d_{32} = 0.55$ | $nd_{32} = 1.51633$ | $vd_{32} = 64.14$ |
| $r_{33} = \infty$ | $d_{33} = 0.1067$ | $nd_{33} = 1.33304$ | $vd_{33} = 55.79$ |
| $r_{34} = \infty$ | | | |

EXAMPLE 4

Figure 10:
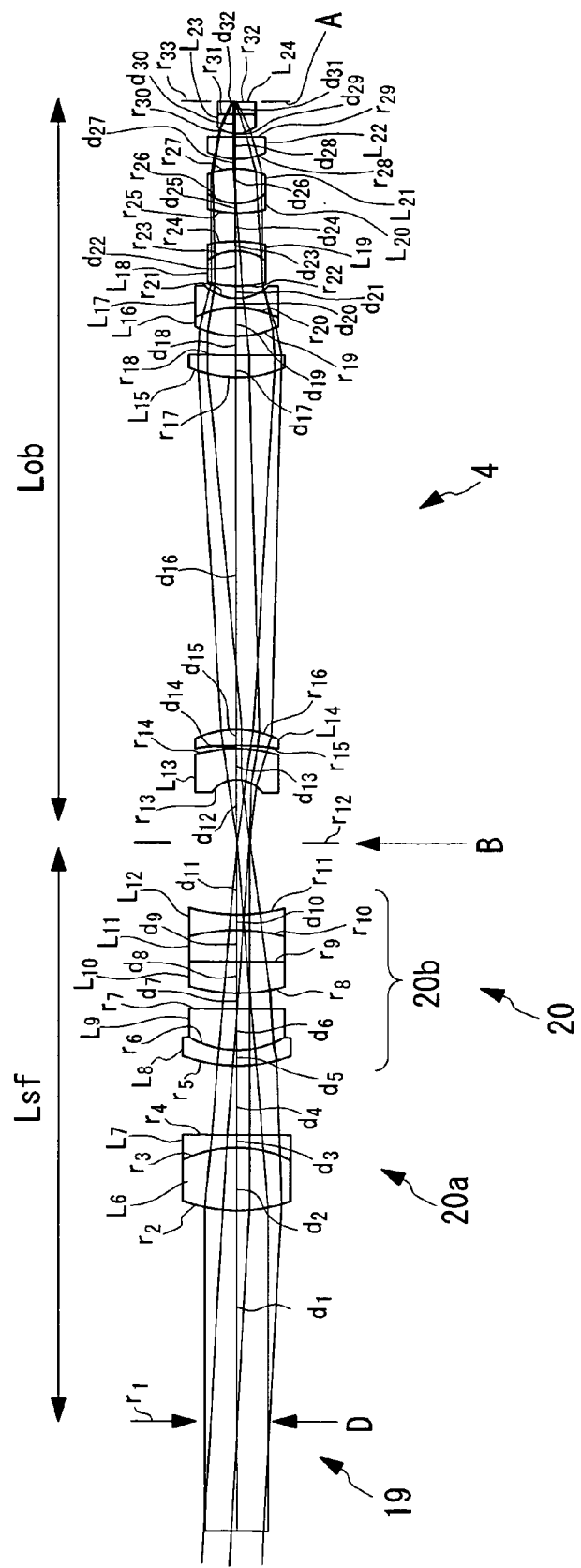
FIG. 10 is a diagram, taken along the optical axis, showing the configuration of the pupil projection optical system and the objective optical system according to a fourth example of the present invention.

FIG. 10 is a cross-section, taken along the optical axis, showing the configuration of a fourth example of the pupil projection optical system 20 and the objective optical system unit 4.

The pupil projection optical system 20 includes a first lens group 20a formed of a positive compound lens composed of a biconvex lens $L_6$ and a negative meniscus lens $L_7$; and a second lens group 20b formed of a positive compound lens, composed of a negative meniscus lens $L_8$ and a plano-convex lens $L_9$, whose convex surface faces the optical scanning unit 19 and a negative compound lens, composed of a plano-convex lens $L_{10}$, a plano convex lens $L_{11}$, and a biconcave lens $L_{12}$, whose convex surface faces the optical scanning unit 19.

The objective optical system unit 4 includes a negative meniscus lens $L_{13}$ whose concave surface faces the optical scanning unit 19, a positive meniscus lens $L_{14}$ whose concave surface faces the optical scanning unit 19, a plano-convex lens $L_{15}$ whose convex surface faces the optical scanning unit 19, a negative compound lens composed of a biconvex lens $L_{16}$ and a biconcave lens $L_{17}$, a positive compound lens composed of a biconvex lens $L_{18}$ and a negative meniscus lens $L_{19}$, a positive compound lens composed of a negative meniscus lens $L_{20}$ and a biconvex lens $L_{21}$, a positive meniscus lens $L_{22}$ whose convex surface faces the optical scanning unit 19, a plano-convex lens $L_{23}$ whose convex surface faces the optical scanning unit 19, and a flat plate $L_{24}$.

The fourth example is a design example in which the conjugate position of the optical scanning unit is substantially at infinity, so that the magnification does not change even if the distance between the pupil projection optical system and the objective optical system varies.

The specification data of the optical elements forming the optical system of the fourth example is shown below.

Specification data

| | | | |
|---|---|---|---|
| $r_1 = \infty$ | $d_1 = 10$ | | |
| $r_2 = 7.56$ | $d_2 = 3$ | $nd_2 = 1.43875$ | $vd_2 = 94.93$ |
| $r_3 = -6.422$ | $d_3 = 0.61$ | $nd_3 = 1.51633$ | $vd_3 = 64.14$ |
| $r_4 = \infty$ | $d_4 = 3.37$ | | |
| $r_5 = 7.902$ | $d_5 = 0.6$ | $nd_5 = 1.741$ | $vd_5 = 52.64$ |
| $r_6 = 4.002$ | $d_6 = 2$ | $nd_6 = 1.43875$ | $vd_6 = 94.93$ |
| $r_7 = \infty$ | $d_7 = 0.75$ | | |
| $r_8 = 8.136$ | $d_8 = 1.52$ | $nd_8 = 1.497$ | $vd_8 = 81.54$ |
| $r_9 = \infty$ | $d_9 = 1.5$ | $nd_9 = 1.6779$ | $vd_9 = 55.34$ |
| $r_{10} = -9.282$ | $d_{10} = 0.75$ | $nd_{10} = 1.51633$ | $vd_{10} = 64.14$ |
| $r_{11} = 8.44$ | $d_{11} = 3.52$ | | |
| $r_{12} = \infty$ | $d_{12} = 2.89$ | | |
| $r_{13} = -1.5384$ | $d_{13} = 1.5298$ | $nd_{13} = 1.51633$ | $vd_{13} = 64.14$ |
| $r_{14} = -5.4767$ | $d_{14} = 0.1$ | | |
| $r_{15} = -16.2798$ | $d_{15} = 0.8$ | $nd_{15} = 1.7725$ | $vd_{15} = 49.6$ |
| $r_{16} = -3.7151$ | $d_{16} = 16.8295$ | | |
| $r_{17} = 6.2201$ | $d_{17} = 1$ | $nd_{17} = 1.43875$ | $vd_{17} = 94.93$ |
| $r_{18} = \infty$ | $d_{18} = 0.8$ | | |
| $r_{19} = 3.5$ | $d_{19} = 1.4$ | $nd_{19} = 1.6779$ | $vd_{19} = 55.34$ |
| $r_{20} = -4.3947$ | $d_{20} = 0.41$ | $nd_{20} = 1.6134$ | $vd_{20} = 44.27$ |
| $r_{21} = 2.0869$ | $d_{21} = 0.8$ | | |
| $r_{22} = 9.752$ | $d_{22} = 1.51$ | $nd_{22} = 1.43875$ | $vd_{22} = 94.93$ |
| $r_{23} = -1.6405$ | $d_{23} = 0.4$ | $nd_{23} = 1.7725$ | $vd_{23} = 49.6$ |
| $r_{24} = -4.6449$ | $d_{24} = 1.5$ | | |
| $r_{25} = 8.4707$ | $d_{25} = 0.4$ | $nd_{25} = 1.7725$ | $vd_{25} = 49.6$ |
| $r_{26} = 2.32$ | $d_{26} = 1.63$ | $nd_{26} = 1.43875$ | $vd_{26} = 94.93$ |
| $r_{27} = -2.32$ | $d_{27} = 0.362$ | | |
| $r_{28} = 3.4602$ | $d_{28} = 1$ | $nd_{28} = 1.7725$ | $vd_{28} = 49.6$ |
| $r_{29} = 10.1303$ | $d_{29} = 0.1$ | | |
| $r_{30} = 1.5071$ | $d_{30} = 1.09$ | $nd_{30} = 1.7725$ | $vd_{30} = 49.6$ |
| $r_{31} = \infty$ | $d_{31} = 0.48$ | $nd_{31} = 1.51633$ | $vd_{31} = 64.14$ |
| $r_{32} = \infty$ | $d_{32} = 0.05$ | $nd_{32} = 1.33304$ | $vd_{32} = 55.79$ |
| $r_{33} = \infty$ | | | |

Next, the parameters used in the conditions of the laser-scanning microscope 1 of each of the above-described examples are shown in Table 1. Also, the wavefront aberrations at each wavelength in the examples are shown in Table 2.

TABLE 2

Optical Performance: Wavefront aberration, RMS value (unit: wavelength)

| | Wavelength λ | Obh = 0 | Obh = 0.071 | Obh = 0.141 |
|---|---|---|---|---|
| Example 1 | 435.84 | 0.011 | 0.059 | 0.203 |
| | 486.13 | 0.007 | 0.034 | 0.167 |
| | 546.07 | 0.019 | 0.036 | 0.153 |
| | 587.56 | 0.023 | 0.042 | 0.152 |
| | 656.27 | 0.028 | 0.050 | 0.149 |

| | Wavelength λ | obh = 0 | obh = 0.053 | obh = 0.106 |
|---|---|---|---|---|
| Example 2 | 435.84 | 0.04 | 0.059 | 0.221 |
| | 486.13 | 0.043 | 0.069 | 0.129 |
| | 546.07 | 0.044 | 0.089 | 0.11 |
| | 587.56 | 0.043 | 0.096 | 0.118 |
| | 656.27 | 0.041 | 0.102 | 0.133 |

| | Wavelength λ | obh = 0 | obh = 0.0355 | obh = 0.071 |
|---|---|---|---|---|
| Example 3 | 435.84 | 0.022 | 0.113 | 0.154 |
| | 486.13 | 0.023 | 0.1 | 0.139 |
| | 546.07 | 0.023 | 0.088 | 0.123 |
| | 587.56 | 0.023 | 0.082 | 0.114 |
| | 656.27 | 0.023 | 0.073 | 0.101 |

| | Wavelength λ | obh = 0 | obh = 0.050 | obh = 0.110 |
|---|---|---|---|---|
| Example 4 | 435.84 | 0.014 | 0.052 | 0.096 |
| | 486.13 | 0.020 | 0.054 | 0.098 |
| | 546.07 | 0.023 | 0.054 | 0.097 |
| | 587.56 | 0.023 | 0.053 | 0.096 |
| | 656.27 | 0.024 | 0.052 | 0.094 | obh: object height

Next, a description of modified examples of the laser-scanning microscope 1 according to the present invention as shown in FIG. 1 will be given with reference to FIG. 11 and FIG. 12.

Figure 11:
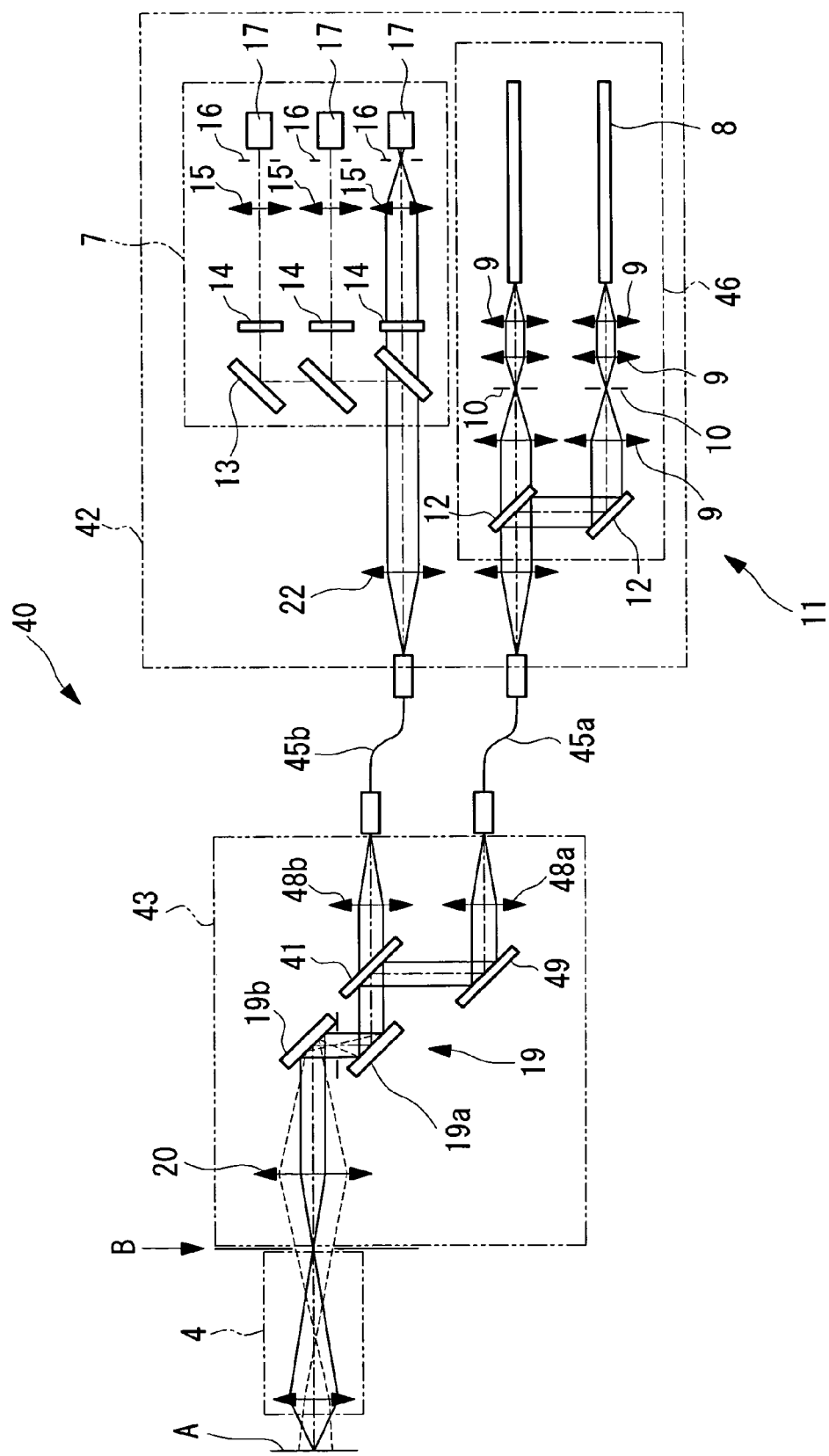
FIG. 11 is a schematic diagram of a laser-scanning microscope according to a first modified example of the present invention.

FIG. 11 is a schematic diagram of a laser-scanning microscope according to a first modified example.

In this laser-scanning microscope 40, a dichroic mirror 41 for separating excitation light (illumination light) and fluorescence (detected light) is disposed not inside an optical unit 40 but inside a scanning unit 43. In this case, a first optical fiber 45a, which guides the excitation light (illumi-

TABLE 1

| | | Example 1 | Example 2 | Example 3 | Example 4 |
|---|---|---|---|---|---|
| Focal length of pupil projection optical system | Fp1 | 11.98 | 11.98 | 11.98 | 12.01 |
| Numerical aperture of pupil projection optical system | NAp1 | 0.125 | 0.125 | 0.125 | 0.12 |
| Distance between optical scanning unit and intermediate image | Lfs | 25 | 28.57 | 25 | 27.62 |
| Distance between intermediate image and conjugate position of optical scanning unit | Lp1 | 12.04 | 12.13 | 12.04 | −91101 |
| Objective optical system tip: lens diameter | Dof | 4.2 | 2.5 | 1.3 | 2.5 |
| Distance between objective optical system and intermediate image | Lob | 34.39 | 27.78 | 10.32 | 35.03 |
| Numerical aperture at specimen side of objective optical system | NAob | 0.69 | 0.7 | 0.5 | 0.73 |
| Condition (1) | $0.04 \leq |NAp1 \cdot Fp1/Lfs| \leq 0.1$ | 0.060 | 0.052 | 0.060 | 0.052 |
| Condition (2) | $0.3 \leq |NAp1 \cdot Fp1/Dof| \leq 4$ | 0.357 | 0.599 | 1.152 | 0.576 |
| Condition (3) | $0.04 \leq |NAp1 \cdot Fp1/Lob| \leq 0.25$ | 0.044 | 0.054 | 0.145 | 0.041 |
| Condition (4) | $|Fp1/Lp1| \leq 1.3$ | 1.00 | 0.99 | 1.00 | 0.00 |
| Condition (5) | $vd > 80$ | 95 | 95 | 95 | 95 |
| Condition (6) | $5 < |Rp1/(Fp1 \cdot \Delta nd1)| < 10$ | 7.40 | 7.50 | 7.40 | 6.89 |
| Condition (7) | $1 < |Rp2/(Fp1 \cdot \Delta nd2)| < 2.5$ | 1.52 | 1.36 | 1.52 | 1.10 | nation light) from a laser light source unit 46 to the scanning unit 43, and a collimator optical system 48a are separate from a second optical fiber 45b, which guides the fluorescence (detected light) from the scanning unit 43 to a detection optical system 7, and a coupling optical system 48b for the fluorescence (detected light), respectively. Reference numeral 49 in the figure represents a mirror for guiding the excitation light passed via the first optical fiber 45a and the collimator optical system 48a for the excitation light (detected light) to the dichroic mirror 41 for separation.

By making the first optical fiber 45a for the excitation light (illumination light) separate from the second optical fiber 45b for the fluorescence (detected light), an optical system with a higher signal-to-noise ratio can be obtained.

Figure 12:
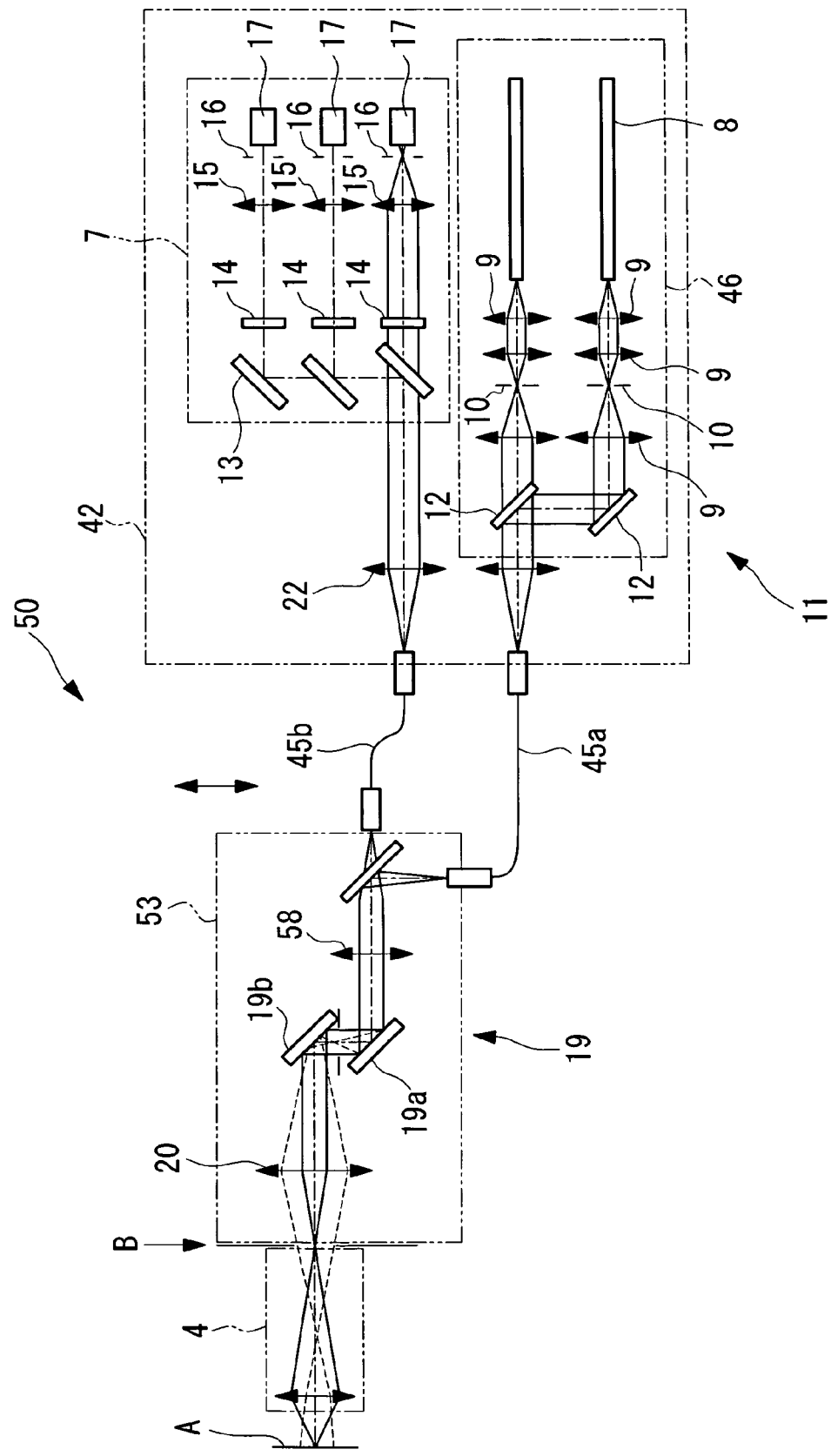
FIG. 12 is a schematic diagram of a laser-scanning microscope according to a second modified example of the present invention.

FIG. 12 is a schematic diagram of a laser-scanning microscope according to a second modified example.

In this laser-scanning microscope 50, a collimator/coupling common optical system 58 has the functions of both of a collimator optical system for excitation light (illumination light) and a coupling optical system for fluorescence (detected light). In this case, since both of the above two optical systems are made by the collimator/coupling common optical system 58 as a single system, a scanning unit 53 can be made compact while maintaining a high signal-to-noise ratio.

When the core diameter of the second optical fiber 45b, which guides the fluorescence (detected light) to a detection optical system 42, in the above first and second modified examples is close to the diffraction limit, the laser-scanning microscope is in a confocal optical system, and a sectioning effect (an effect in which signals at depths other than that of the focal plane can be cut) can be obtained.

On the other hand, when the core diameter of the second optical fiber 45b, which guides the fluorescence (detected light) to a detection optical system 42, is greater than the diffraction limit, the signal-to-noise ratio can be made high, although the separating power becomes low. Accordingly, observation of a thick specimen at a deep position from the surface becomes possible.

What is claimed is:

1. A laser-scanning microscope comprising:
   a laser light source unit;
   an optical fiber that transmits excitation light or illumination light from the laser light source unit;
   a collimator optical system that substantially collimates the excitation light or illumination light from the optical fiber;
   an optical scanning unit that scans the excitation light or illumination light from the collimator optical system onto a specimen;
   a pupil projection optical system that images the excitation light or illumination light from the optical scanning unit at an intermediate image position;
   an objective optical system that re-images the intermediate image of the excitation light or illumination light imaged in the pupil projection optical system onto the specimen; and
   a detection optical system that detects fluorescence or reflected light emitted from the specimen,
   wherein, when the numerical aperture of laser light emitted from the pupil projection optical system at the intermediate image position is NAp1, the focal length of the pupil projection optical system is Fp1, and the distance between the optical scanning unit and the intermediate image position is Lsf, condition (1) below is satisfied:

$$0.04 \leq |NAp1 \times Fp1/Lsf| \leq 0.1 \qquad (1).$$

2. A laser-scanning microscope according to claim 1, wherein when the objective optical system has a maximum lens diameter Dof within 10 mm of the object side of the objective lens unit and when the distance from the tip at the object side of the objective optical system to the intermediate image position is Lob, conditions (2) and (3) below are satisfied:

$$0.3 \leq |Nap1 \times Fp1/Dof| \leq 4 \qquad (2)$$

$$0.04 \leq |Nap1 \times Fp1/Lob| \leq 0.25 \qquad (3).$$

3. A laser-scanning microscope according to claim 1, wherein
   a conjugate position of the optical scanning unit formed by the pupil projection optical system is located towards the specimen side of a specimen-side focal position of the pupil projection optical system, and
   when the distance between the focal position of the pupil projection optical system at the objective-optical-system side and the conjugate position of the optical scanning unit formed by the pupil projection optical system is Lp1, condition (4) below is satisfied:

$$|Fp1/Lp1| \leq 1.3 \qquad (4).$$

4. A laser-scanning microscope according to claim 1, wherein the pupil projection optical system includes, from the optical scanning unit:
   a first lens group having positive refractive power as a whole and including at least one compound lens composed of a positive lens and a negative lens; and
   a second lens group having positive refractive power as a whole, and wherein, when the d-line Abbe number of the positive lens of the lenses in the first lens group is νd, the radius of curvature of the interface surface of the compound lens in the first lens group is Rp1, and the difference in refractive index between the positive lens and the negative lens in the compound lens in the first lens group is Δnd1, conditions (5) and (6) below are satisfied:

$$\nu d > 80 \qquad (5)$$

$$5 < |Rp1/(Fp1 \times \Delta nd1)| < 10 \qquad (6).$$

5. A laser-scanning microscope according to claim 4, wherein the second lens group includes at least one compound lens formed of at least two lenses, and
   wherein, when the radius of curvature of the interface surface of the compound lens in the second lens group is Rp2 and when the difference in refractive index of the at least two lenses constituting the compound lens in the second lens group is Δnd2, condition (7) below is satisfied:

$$0.9 < |Rp2/(Fp1 \times \Delta nd2)| < 2.5 \qquad (7).$$

6. A laser-scanning microscope according to claim 1, wherein the objective optical system is provided so as to be attachable and removable close to the intermediate image position.

7. A laser-scanning microscope according to claim 1, wherein the objective optical system can be attached to and removed from the pupil projection optical system, close to the intermediate image position, while being rotatable with respect thereto.

8. A laser-scanning microscope according to claim 1 comprising:
   a coupling optical system for detection which converges the fluorescence or reflected light emitted from the specimen, and
   an optical fiber for detection which transmits the fluorescence or reflected light which has been converged by the coupling optical system for detection.

9. A laser-scanning microscope according to claim 8 wherein the collimator optical system and the coupling optical system for detection are a system in common.

10. A laser-scanning microscope according to claim 8 wherein the collimator optical system and the coupling optical system for detection are separate systems, and the core diameter of the optical fiber for detection is greater than the diffraction limit.

* * * * *